United States Patent Office 2,873,031
Patented Feb. 10, 1959

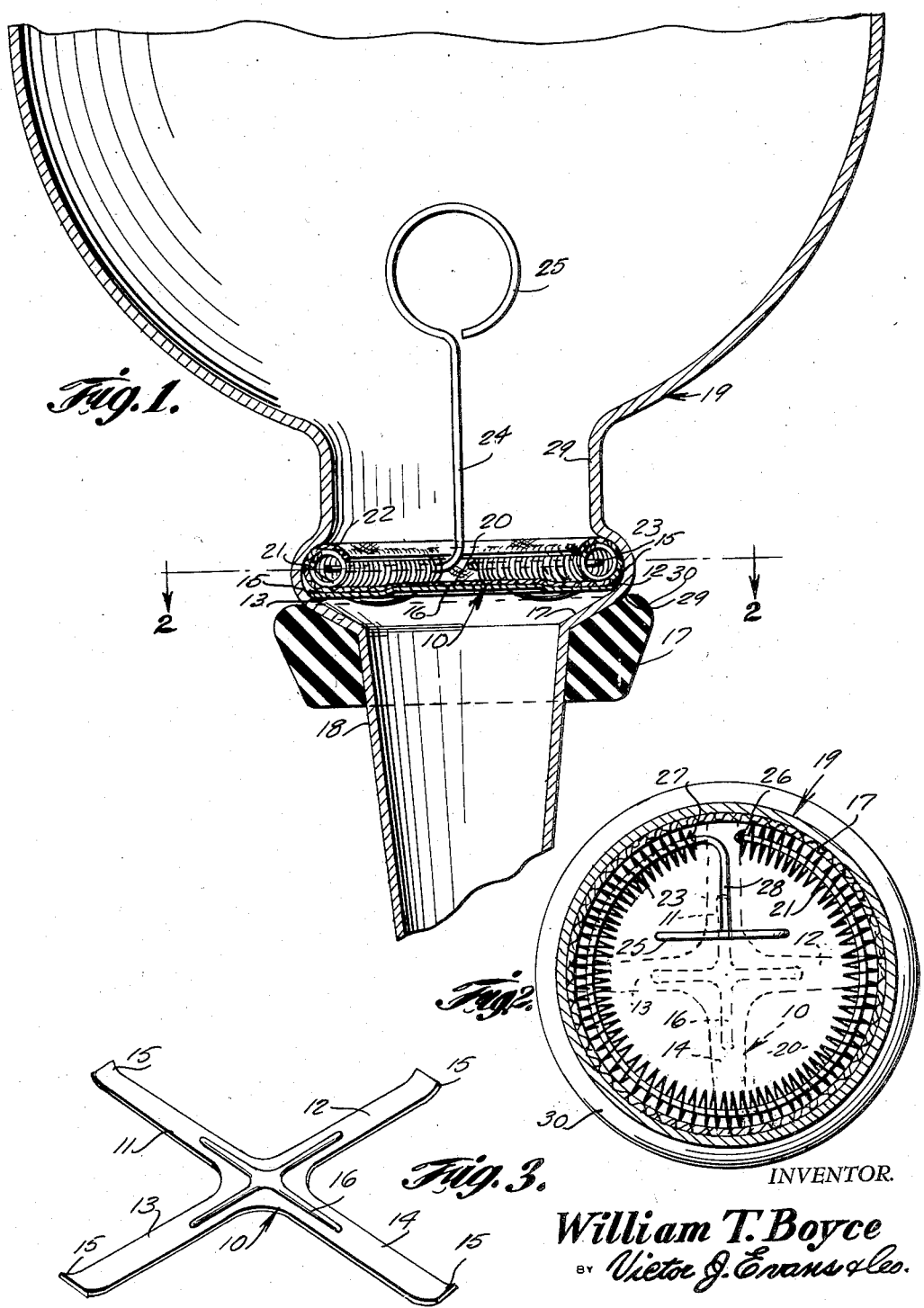

2,873,031

COFFEE PERCOLATOR STRAINER SUPPORT

William T. Boyce, Washington, D. C.

Application May 18, 1956, Serial No. 585,713

5 Claims. (Cl. 210—480)

This invention relates to conventional coffee percolators having upper and lower containers with water placed in the lower container and coffee on a strainer in the upper container and wherein upon the application of heat to the lower container water is forced upwardly into the upper container from which the coffee drains back through the coffee grounds into the lower container as the heat is removed; and in particular a spider or rigid support extended across the neck of the upper container and positioned below the cloth strainer for retaining the strainer in a substantially horizontal position and prevent the strainer dropping downwardly and forming a closure for the neck or throat.

The purpose of this invention is to provide a device adapted to be pressed into an annular recess in the downwardly extended spout or neck of an upper container of a coffee percolator for supporting the strainer.

With conventional coffee percolators the coffee grounds are retained in an upper container with a cloth strainer which extends across the throat or neck of the upper container and which is provided with a continuous hem in which a coil spring is positioned whereby the spring holds the peripheral edge of the strainer in an annular recess in the neck and spaced downwardly from the lower portion of the container. With the strainer supported only at the peripheral edge the weight of coffee grounds thereon causes the strainer to sag and close the opening at the upper end of the neck providing choking means and retaining the water in the upper container instead of permitting the water to drop through to the lower container. With this thought in mind this invention contemplates a support positioned below the strainer for supporting the strainer in a horizontally disposed position making it substantially impossible for the strainer to drop downwardly and choke the upper end of the neck or throat.

The object of this invention is, therefore, to provide a rigid support for a strainer of a coffee percolator whereby the strainer is retained in a horizontally disposed position.

Another object of the invention is to provide a coffee percolator strainer support that is adapted to be positioned in percolators now in use.

A further object of the invention is to provide a support for a strainer of a coffee percolator in which the support is of a simple and economical construction.

With these and other objects and advantages in view the invention embodies a cross or spider having radially disposed arms, with extended ends of the arms curved upwardly, and with the central portion reinforced with a corrugated section.

Other features and advantages of the invention will appear from the following description, taken in connection with the drawings, wherein:

Figure 1 is a vertical section through the intermediate portion of the upper container of a coffee percolator showing the device positioned below the strainer thereof.

Figure 2 is sectional plan through the neck of the upper container taken on line 2—2 of Figure 1, with the support shown in dotted lines.

Figure 3 is a perspective view of the improved coffee percolator strainer support.

Referring now to the drawing wherein like reference characters denote corresponding parts the improved coffee percolator strainer support of this invention includes a cross 10 having arms 11, 12, 13 and 14 with the arms provided with upwardly extended end sections 15 and with the intermediate portions of the arms reinforced with grooves or corrugations 16.

With the support formed as illustrated in Fig. 3 it is inserted in an annular recess 17 in a neck 18 of a container 19 of a coffee percolator and with the support or spider in position, as illustrated in Fig. 1, a strainer 20 having a coil spring 21 in a continuous hem or tunnel 22 in the periphery of the strainer is positioned upon the support with the spring retaining the periphery in the recess whereby the intermediate part of the material of the strainer is retained in tension and the bulge or sag downwardly with the weight of coffee grounds thereon is eliminated by the support 10 which holds the strainer in a horizontal position.

The coil spring 21 is mounted on a wire 23 from which a stem 24 with a loop or handle 25 on the upper end extends. The wire coil is retained in position upon the wire 23 by securing the end of the coil to the end 26 of the wire 23 by spot welding, solder, or the like. The opposite end of the coil is also provided with a relatively small convolution 27 that is crimped on the wire 23, also to retain the coil in position.

The lower end of the stem 25 is provided with a section 28 that extends across to the end of the wire 23, as shown in Fig. 2.

The upper portion of the neck 18 of the upper container is provided with a cylindrical section 29 and the section 29 and also the outer surface of the annular recess 17 are covered with a stopper 30 of suitable resilient material whereby with the stopper 30 positioned in the upper end of the lower container of a percolator the lower container is sealed and the only outlet for water expanded in the lower container is upwardly through the neck 18 and coffee grounds positioned on the strainer. Upon removal of heat vacuum formed in the lower container draws the water downwardly through the coffee grounds providing coffee in the lower container and with the cloth strainer supported by the support or spider 10 the possibility of the upper portion of the neck 18 being choked is eliminated.

The support 10 may be provided in different designs and may be formed with any suitable number of arms and the arms may be provided in different patterns.

It will also be understood that other modifications, within the scope of the appended claims, may be made in the design and arrangement of the parts without departing from the spirit of the invention.

What is claimed is:

1. A support for use in a percolator having an upper container with a neck and having an annular recess in said neck, a rigid support having radially disposed arms that are positioned in the same horizontal plane extended across the neck and mounted with the ends of the arms positioned in the annular recess, said arms having upwardly extending end sections and reinforcing corrugations at the intermediate portions thereof extending along the longitudinal axis of said arms, and a cloth strainer mounted on the support and positioned with edges thereof in the annular recess.

2. In a percolator strainer support, the combination which comprises an upper container having a depending neck with an annular recess in the upper portion of the neck, a cloth strainer having a coil spring in the peripheral edge positioned with said peripheral edge in the annular recess of the neck of the container, and a support having radially disposed arms that are positioned in the same horizontal plane positioned below the cloth strainer, said arms having upwardly curved end sections that are into the annular recess of the neck of the container and reinforcing corrugations at the intermediate portions thereof extending along the longitudinal axis of said arms.

3. In a coffee percolator, the combination which comprises an upper container having a tapering depending neck with an annular recess in the upper portion, a support having radially disposed arms extended from the center thereof and positioned in the same horizontal plane with the extended ends of the arms into said annular recess of the neck of the upper container, said arms having upwardly curved end sections and reinforcing corrugations at the intermediate portions thereof extending along the longitudinal axis of said arms and a cloth strainer having a coil spring in the edge positioned with the coil spring retaining the edge of the strainer in the annular recess of the neck.

4. A coffee percolator strainer comprising a circular piece of material, a coil spring positioned in the peripheral edge of said circular piece of material, a circular wire extended through said coil spring and having a loop providing a handle extended upwardly from an offset portion extended from one end of the wire, the opposite end of the wire being secured to the end of the coil spring by spot welding, and a star-shaped support having radially disposed arms that extend in the same horizontal plane positioned against the under surface of the strainer, said arms having upwardly extending end sections and reinforcing corrugations at the intermediate portions thereof extending along the longitudinal axis of said arms.

5. In a coffee percolator, the combination which comprises an upper container having a tapering depending neck with an annular recess in the upper portion, a support having radially disposed arms extended from the center thereof positioned with extended ends of the arms in said annular recess of the neck of the upper container, said arms having upwardly extending end sections and reinforcing corrugations positioned at the intermediate portions thereof with the corrugations extending along the longitudinal axis of said arms and a cloth strainer having a circular support element in the edge positioned with the circular support element retaining the edge of the strainer in the annular recess of the neck and with the ends of the radially disposed arms bridged by said circular support member.

References Cited in the file of this patent

UNITED STATES PATENTS

| 843,465 | Koehler | Oct. 19, 1906 |
| 1,929,605 | Perlman | Oct. 10, 1933 |
| 1,986,957 | Cargill | Jan. 8, 1935 |
| 2,211,414 | Francis | Aug. 13, 1940 |
| 2,282,767 | Peterson | May 12, 1942 |

FOREIGN PATENTS

| 672,450 | Great Britain | May 21, 1952 |